(12) United States Patent
Eldridge et al.

(10) Patent No.: US 6,307,977 B1
(45) Date of Patent: Oct. 23, 2001

(54) SET OF RUN-LENGTH CODEWORDS CONTAINING PRINTING HINTS

(75) Inventors: George L. Eldridge, Long Beach; David E. Rumph, Pasadena; Farzin Blurfrushan, Redondo Beach; Ronald E. Rider, Menlo Park, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/193,185

(22) Filed: Nov. 17, 1998

(51) Int. Cl.[7] ........................................ G06K 9/36
(52) U.S. Cl. ............................. 382/245; 358/1.9
(58) Field of Search .................... 382/244, 245; 358/1.2, 1.9, 261.1, 150, 155

(56) References Cited

U.S. PATENT DOCUMENTS

| | | | |
|---|---|---|---|
| 4,481,532 | * 11/1984 | Clark et al. | 358/1.9 |
| 5,687,303 | * 11/1997 | Motamed et al. | 358/1.17 |
| 5,754,746 | * 5/1998 | Blurfrushan et al. | 358/1.17 |
| 6,034,700 | * 3/2000 | Rumph et al. | 382/245 |
| 6,078,696 | * 6/2000 | Nguyen et al. | 382/253 |
| 6,091,509 | * 7/2000 | Hickman et al. | 358/1.16 |

* cited by examiner

*Primary Examiner*—Jon Chang
*Assistant Examiner*—Jingge Wu
(74) *Attorney, Agent, or Firm*—Philip T. Virga

(57) ABSTRACT

A run length codeword system which has a set of codewords, each codeword being one byte. The first codeword of a run is divided into a 4-bit code part and 4 bits of printing hints. The code part specifies the source of the data, and the format of the remaining bytes in the run. The remaining one or two codewords specify the number of remaining data bytes in the run, or color values.

1 Claim, 3 Drawing Sheets

| RLC CODES | COMMANDS |
|---|---|
| 0010 TTTT+<br>COLOR VALUE (1 byte, 0-255) | ONE PIXEL (2 bytes)<br>TTTT - RENDERING HINTS VALUE |
| 0010 TTTT+<br>LENGTH (1 byte, 2-255) +<br>COLOR VALUE (1 byte, 0-255) | SHORT RUN (3 bytes) |
| 0101 TTTT+<br>LENGTH (2 bytes, 256 - 65535) +<br>COLOR VALUE (1 byte, 0-255) | LONG RUN (4 bytes) |
| 0110 TTTT+<br>LENGTH (1 byte, 2 - 255) +<br>COLOR VALUE (n bytes, 0-255) | SHORT LITERAL (n+2 bytes) |
| 0111 TTTT+<br>LENGTH (2 bytes, 256 - 65535 ) +<br>COLOR VALUE (n bytes, 0-255) | LONG LITERAL (n+3 bytes) |
| 1000 TTTT+<br>LENGTH (1 byte, 1-255 ) | SHORT TRANSPARENT<br>(n+2 bytes) |
| 1001 TTTT+<br>LENGTH (2 bytes, 256-65535 ) | LONG TRANSPARENT<br>(n+3 bytes) |

| RLC CODES | COMMANDS |
|---|---|
| 0010 TTTT + <br> COLOR VALUE (1 byte, 0-255) | ONE PIXEL (2 bytes) <br> TTTT - RENDERING HINTS VALUE |
| 0010 TTTT + <br> LENGTH (1 byte, 2-255) + <br> COLOR VALUE (1 byte, 0-255) | SHORT RUN (3 bytes) |
| 0101 TTTT + <br> LENGTH (2 bytes, 256 - 65535) + <br> COLOR VALUE (1 byte, 0-255) | LONG RUN (4 bytes) |
| 0110 TTTT + <br> LENGTH (1 byte, 2 - 255) + <br> COLOR VALUE (n bytes, 0-255) | SHORT LITERAL (n+2 bytes) |
| 0111 TTTT + <br> LENGTH (2 bytes, 256 - 65535 ) + <br> COLOR VALUE (n bytes, 0-255) | LONG LITERAL (n+3 bytes) |
| 1000 TTTT + <br> LENGTH (1 byte, 1-255 ) | SHORT TRANSPARENT <br> (n+2 bytes) |
| 1001 TTTT + <br> LENGTH (2 bytes, 256-65535 ) | LONG TRANSPARENT <br> (n+3 bytes) |

*FIG. 1*

SET OF RUN-LENGTH CODEWORDS CONTAINING PRINTING HINTS

BACKGROUND OF THE INVENTION

A set of eight-bit compression code words that are used at the beginning of a data run comprising a pixel count and one or more color values, the first four bits of the first word being used to specify the format of the bytes in the following data stream and whether the following pixels are to be printed as the overlay or as the background, and the last four bits being used to specify printing hints.

It is convenient for a printer to receive color image data in compressed form, and to expand that data just prior to printing. The compressed data typically contains text, computer generated graphics and scanned images, and each needs to be compressed and printed differently. For example, text is likely to be compressed using run length encoding and is constant color, so one byte is all that is required to describe the color of all pixels. On the other hand, a scanned-in image will continuously change color, so will require a color byte for each pixel, may be compressed using a lossy algorithm like JPEG, and will need to be halftoned at the printer.

To accommodate such a diverse set of inputs, a printer will need to get printing hints, along with the data, to handle each efficiently. One method would be to provide each printing hint with the boundary, coordinates or a bit map, to define the area in which the printing hint is to be used. Such a set of printing hints would be, for example, an eight-bit word divided into four two-bit sections, each section therefore being able to specify four choices. The first section could specify that the following data is text, contone, graphics, etc. The second set could specify one of four halftone screens. The third could identify the decompression algorithm required. Etc.

A number of compression algorithms are available. The particular ones assumed for this application are for data streams that are either scanned-in color that are DCT (discrete cosine transform), such as JPEG (Joint Photographic Experts Group) and LZ (Lempel Ziv) encoded, or computer generated graphics and text that are run length encoded (RLC).

It is also common to print an overlay over a background. The overlay is usually text and the background could be a form or a scanned-in picture. A bit map could be used to direct data from the desired data source to the printer for each pixel.

SUMMARY OF THE INVENTION

This system provides a set of code words for runs of overlay or background data, the first four bits of which describe the format of the following data stream. The format possibilities are that the next byte or two are the number of bytes in the run, that the remaining bytes are color values, and that the next byte or two are the number of pixels that should be taken from the overlay or background data source.

The next four bits are a printing hint, usually the identification of a halftone screen which should be used for the data, but could be any other kind of hint, such as whether high addressability should be used.

By combining format, color values and printing information along with the run length, this codeword system can use a single channel to provide the printer with a variety of information through one decompressor.

BRIEF DESCRIPTION OF THE DRAWINGS

FIG. 1 is a table of codewords.

DETAILED DESCRIPTION OF THE INVENTION

The set of codewords is shown in FIG. 1. The first four bits of the first code word is 0010 and indicates that the next byte in the data stream is the color value of the next pixel in the image to be printed. The data stream in this case is 2 bytes to describe 1 pixel.

The second codeword is 0100 and indicates that the next byte in the data stream is the number of constant color bytes in the run, followed by a byte specifying the color value of all pixels. The data stream in this case is 3 bytes to describe from 2 to 255 pixels.

The third codeword is 0101 and indicates that the next 2 bytes in the data stream is the number of constant color bytes in the run, followed by a byte specifying the color value of all pixels. The data stream in this case is 4 bytes to describe from 256 to 65,535 pixels.

The fourth codeword is 0110 and indicates that the next byte specifies the number n of pixels to follow, up to 255, followed by n bytes, each describing the color value of one pixel. The data stream in this case is n+2 bytes to describe n pixels.

The fifth codeword is 0111 and indicates that the next 2 bytes specify the number n of pixels to follow, up to 65,535, followed by n bytes, each describing the color value of one pixel. The data stream in this case is n+3 bytes to describe n pixels.

In this system the data sent to the printer is either LZ and JPEG decoded, or RLC decoded. The codewords control which data is used for each individual pixel. For the codewords described above, the RLC data (overlay) is used. For the ones below, the other channel (background) is used.

The sixth codeword is 1000 and indicates that the next byte specifies that the number n of pixels, up to 255, are to be selected from the other channel.

The seventh codeword is 1001 and indicates that the next 2 bytes specify that the number n of pixels, up to 65,535, are to be selected from the other channel.

An all-zero codeword is reserved for No Op padding, and the unused permutations of bits are reserved.

Figure 2:
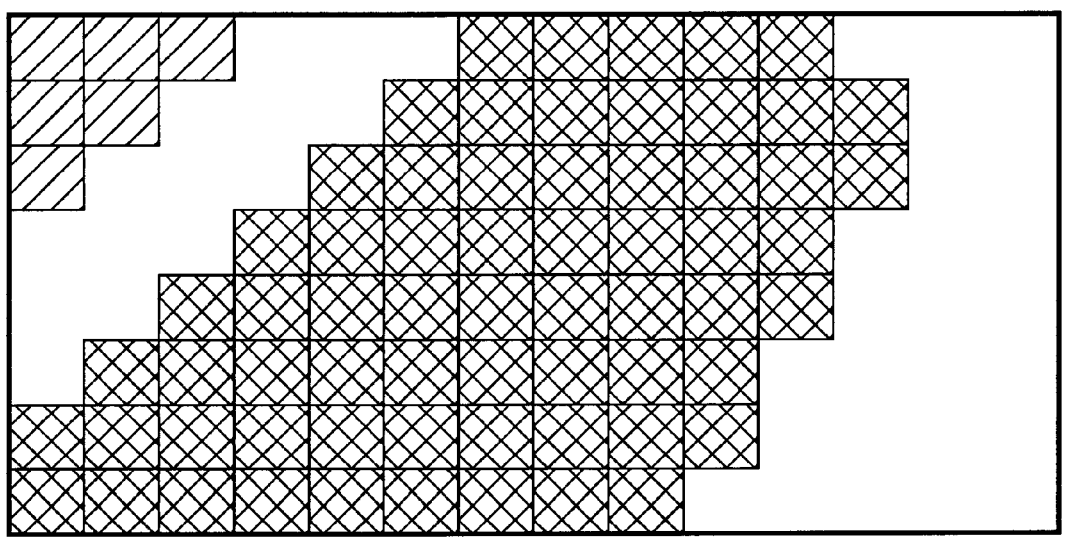
FIG. 2 is diagram showing the correlation between the codewords and the resultant image.

FIG. 2 is an 8 by 14 pixel image that shows a typical use of the codewords. Assume that the two crosshatched areas are two different colors with values of 100 and 200 and that in each blank space a pixel from the other channel is to be selected. In this case following four RLC codewords would be needed to describe the first line of pixels.

0100 TTTT, 0000 0011, 0000 0100=3 pixels of 100

1000 TTTT, 0000 0011=three pixels from the other channel

0100 TTTT, 0000 0101, 0000 0200=5 pixels of 200

1000 TTTT, 0000 0011=three pixels from the other channel

Advantages of this system can now be seen. One is that, most of the time, printing hints are not transmitted to the printer except at the boundaries between types of images, where the hint is most likely to be changed. For example, if a long line of constant color is followed by a long line of contone, a printing hint will be transferred to the printer only at the beginning of each run, the only places where they are necessary. Also, no separate data channel is required for printing hints, or for a bit map to determine where the hint must be applied. The hints are incorporated into the run length encoding data channel.

Figure 3:
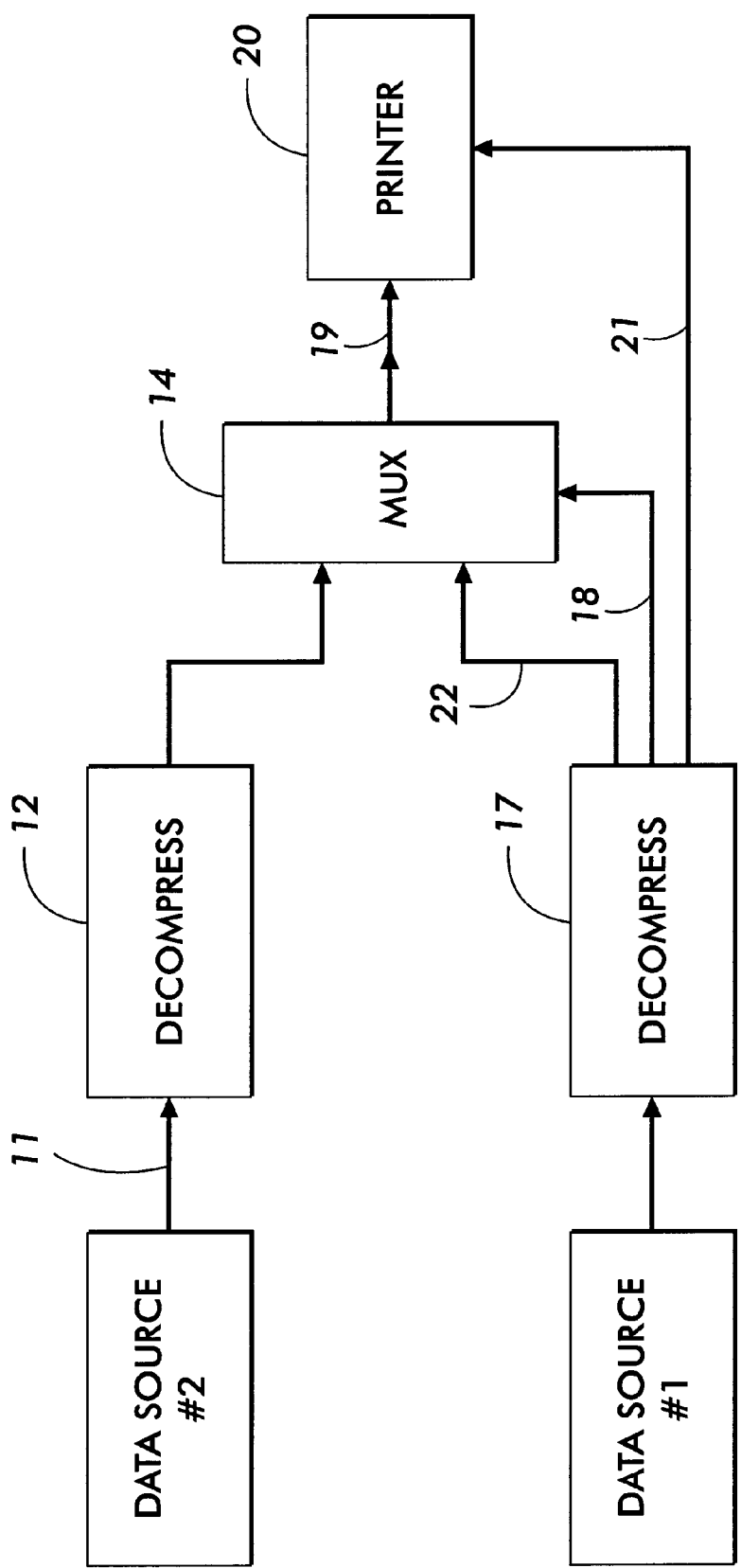
FIG. 3 is an overall block diagram of the system.

FIG. 3 is an overall block diagram showing the general arrangements of the circuit elements. Data source #1 stores the overlay, assume text, and data channel #2 stores the background, assume a contone picture. The background data 11 is decompressed at decompressor 12 and is applied one pixel per clock pulse to one input of the multiplexer 14. The data from data source #1 is run length encoded and arrives at the decompressor 17 in the form shown in FIG. 1. The printing hints 21 are decoded and sent directly to the printer 20. The data 22 is decoded and applied as one pixel per clock to the multiplexer 14. Finally, the transparency information is decoded into a one bit control line 18 and is used to control the multiplexer, to feed the printer either an overlay or background pixel 19.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A run length encoding system comprising:

providing one or more code words to be used in a printing system which prints pixels from a data source;

the codewords located at the beginning of a run of data words, each word being an x-bit byte where X=8, y bits of which specify whether a following byte is a run length or a color value, the remaining z bits where z=4 of which specify a printing hint for the run; and an additional codeword which is coded to specify that the next byte or two bytes are a run length of pixels that are to be printed from an alternate data source, wherein if the y bits specify that the following byte is a run length, the y bits will also specify either that the data should be taken from an alternate data source, or that the next byte is a color value.

* * * * *